(12) United States Patent
Pandraud et al.

(10) Patent No.: US 8,789,706 B2
(45) Date of Patent: Jul. 29, 2014

(54) SCREENING AND ALIGNMENT OF NUCLEAR FUEL PELLETS

(75) Inventors: Jean-Luc Pandraud, Cavillargues (FR); Florian Reyrolle, Laudun (FR); Dominique Francois, Verfeuil (FR); Jerome Blancher, Courtaezon (FR)

(73) Assignee: Areva NC, Paris (FR)

( * ) Notice: Subject to any disclaimer, the term of this patent is extended or adjusted under 35 U.S.C. 154(b) by 873 days.

(21) Appl. No.: 12/161,160

(22) PCT Filed: Jan. 15, 2007

(86) PCT No.: PCT/EP2007/050315
§ 371 (c)(1),
(2), (4) Date: May 24, 2010

(87) PCT Pub. No.: WO2007/080188
PCT Pub. Date: Jul. 19, 2007

(65) Prior Publication Data
US 2011/0061994 A1    Mar. 17, 2011

(30) Foreign Application Priority Data

Jan. 16, 2006    (FR) ...................................... 06 50143

(51) Int. Cl.
*B07B 1/46* (2006.01)
(52) U.S. Cl.
USPC ........... 209/320; 209/236; 209/263; 209/308; 209/920
(58) Field of Classification Search
USPC ........ 209/236, 242, 263, 308, 320, 394, 44.4, 209/269, 311, 395, 399
See application file for complete search history.

(56) References Cited

U.S. PATENT DOCUMENTS

| | | | |
|---|---|---|---|
| 3,454,162 A * | 7/1969 | Cover | 209/269 |
| 3,642,133 A | 2/1972 | Venanzetti | |
| 4,082,657 A * | 4/1978 | Gage | 209/311 |
| 4,235,066 A | 11/1980 | King | |
| 4,664,790 A * | 5/1987 | Lundqvist | 209/395 |
| 5,232,099 A * | 8/1993 | Maynard | 209/311 |
| 5,341,937 A * | 8/1994 | Vos | 209/38 |
| 5,341,939 A * | 8/1994 | Aitchison et al. | 209/319 |
| 5,641,069 A * | 6/1997 | Coffey, Jr. | 209/44.4 |
| 6,132,297 A | 10/2000 | Couzy et al. | |

(Continued)

FOREIGN PATENT DOCUMENTS

| | | |
|---|---|---|
| CN | 2303687 Y | 1/1999 |
| CN | 2317958 Y | 5/1999 |

(Continued)

OTHER PUBLICATIONS

International Search Report, Application No. PCT/EP2007/050315, dated Mar. 27, 2007.

(Continued)

Primary Examiner — Terrell Matthews
(74) Attorney, Agent, or Firm — Nixon Peabody LLP

(57) ABSTRACT

A conveyor device has a sequence of two vibrating screens vertically separated (d) from each other and supplying an alignment bowl, to eliminate chips and residue from nuclear fuel pellets stored in bulk in a boat and to align them in order to fill fuel rods. Due to these two screens, pellets are set aside and turned over, and chips are efficiently separated in a pot, without any congestion of the system.

12 Claims, 2 Drawing Sheets

(56) References Cited

U.S. PATENT DOCUMENTS

| | | | |
|---|---|---|---|
| 6,729,948 B2 | 5/2004 | Engelvin et al. | |
| 2008/0093268 A1* | 4/2008 | Hukki et al. | 209/399 |
| 2009/0206011 A1* | 8/2009 | Cudahy | 209/365.3 |

FOREIGN PATENT DOCUMENTS

| | | | | |
|---|---|---|---|---|
| DE | 9004198 | | 8/1990 | |
| FR | 2667398 | | 4/1992 | |
| FR | 2667398 | A1 * | 4/1992 | B07C 5/34 |
| FR | 2779134 | | 3/1999 | |
| JP | S55-004589 | A | 1/1980 | |
| JP | S55-061518 | A | 5/1980 | |
| JP | S61-041989 | A | 2/1986 | |
| JP | 1318996 | | 12/1989 | |
| JP | 10029719 | | 2/1998 | |
| JP | 2825307 | | 12/2002 | |

OTHER PUBLICATIONS

Chinese Office Action front page in Chinese Application No. 200780002417.X, dated Sep. 14, 2010. (Front page only).

Chinese Office Action in Chinese Application No. 200780002417.X, dated Sep. 14, 2010. (English translation included).

* cited by examiner

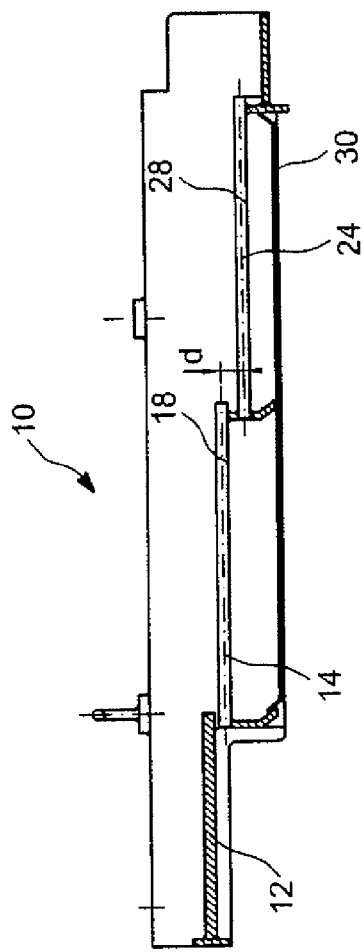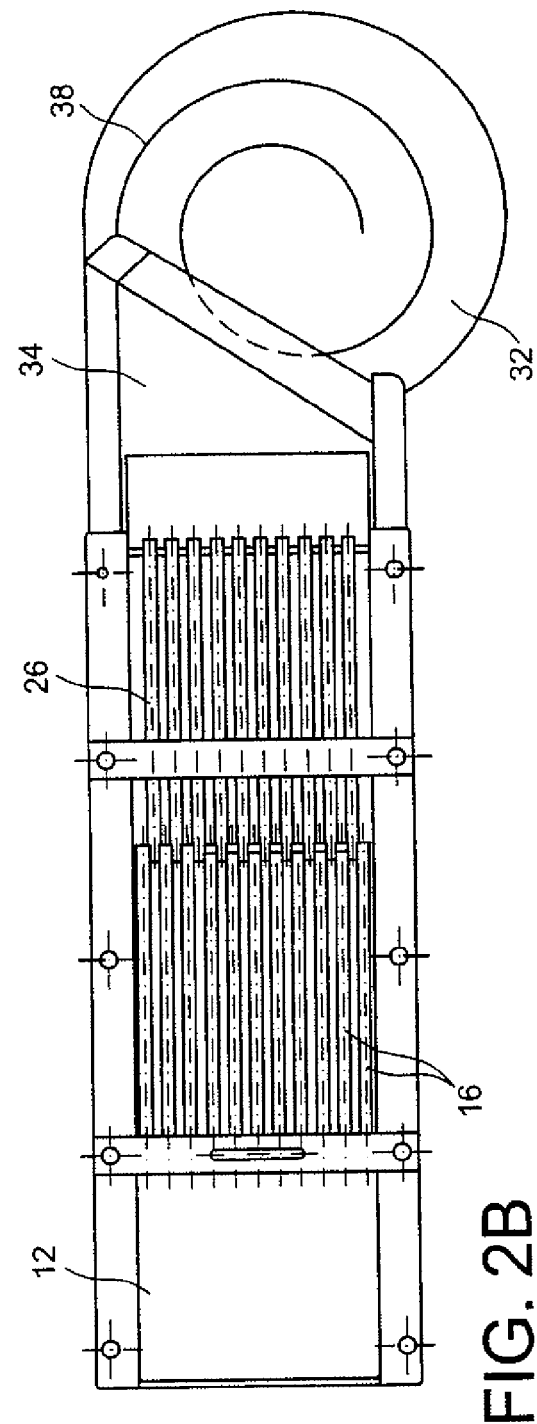

SCREENING AND ALIGNMENT OF NUCLEAR FUEL PELLETS

CROSS REFERENCE TO RELATED APPLICATIONS OR PRIORITY CLAIM

This application is a national phase of International Application No. PCT/EP2007/050315, entitled "SCREENING AND ALIGNMENT OF NUCLEAR FUEL PELLETS", which was filed on Jan. 15, 2007, and which claims priority of French Patent Application No. 06 50143, filed Jan. 16, 2006.

DESCRIPTION

1. Technical Field

This invention relates to manufacturing of rods used as nuclear fuel elements, and particularly filling them with pellets. More precisely, the invention relates to the step in which pellets are put into place before they are inserted into rod cladding.

More generally, the invention relates to alignment of cylindrical objects starting from bulk storage: the invention relates to a device and a method for putting cylindrical objects into line starting from boats in which they have been stored, while eliminating elements that had been mixed with them, particularly such as chips of nuclear fuel pellets.

2. State of Prior Art

During manufacturing of nuclear fuel described for example in FR 2 825 307, pellets are obtained by pressing powders followed by sintering at high temperature. Sintering is done in refractory boats in which the pressed pellets may be arranged at random. Sintered pellets are then ground, possibly after storage, in other words they are adjusted to the size of the cladding in which they will finally be inserted to form fuel rods, after a large number of intermediate inspections (such as checking the dimensions).

Therefore, pellets stored in bulk in the boats have to be aligned so as to enable more or less continuous progress of the production method. For example document FR 2 667 398 describes alignment of pellets by means of a vibrating bowl in which the pellets are poured. Such a bowl, used conventionally, may be adapted to minimize the presence of residue; see JP 10029719. Furthermore, the different steps imply the displacement of pellets, for example along a conveyor, that in particular may comprise a belt or a <<dual wire>> as described in FR 2 779 134.

It is clear that malfunctions and blockages can occur, for example when a pellet is not properly in position and/or when chips or dust are deposited on the conveyor; these incidents can be penalising in terms of cost and time considering the stoppages that they cause, but also due to pellets that satisfy the specifications being rejected because they were blocked.

It is thus desirable to limit the quantity of pellet chips, fragments and dust as early as possible, particularly when pellets are aligned before grinding, so as to reduce risks of blockage on the production line. There is no existing device that can satisfy all these conditions.

PRESENTATION OF THE INVENTION

The invention proposes to overcome the disadvantages of existing devices and relates to a system capable of achieving the above-mentioned purposes.

More generally, the purpose of the invention is a system to separate more or less uniform cylindrical objects stored in bulk, to sort them and keep only those that satisfy specific specifications, and to evacuate residue to a system for collection and to align conforming objects. The system is particularly applicable for nuclear fuel pellets, and may be placed in a glove box and operate automatically.

According to one of the aspects of the invention, it relates to a conveyor system, possibly comprising a vibrating corridor on the upstream side and comprising a sequence of at least two screens preferably moved by vibrating bases, on the downstream side of the vibrating corridor along the direction of displacement of objects. The means of vibrating the screen are independent, and for example are adapted to generate a different displacement speed for each; for example, at least two screens are separated from each other along a vertical direction (actually perpendicular to the displacement direction), such that cylindrical objects moving on the device move discontinuously so that they can be turned over.

Apart from their displacement speed, the two screens are advantageously identical and are composed of horizontal bars, the axis of which is parallel to the displacement of objects, spaced at a pitch appropriate to the size of the objects and preferably equal to the diameter of the bars. Advantageously, apart from their vertical spacing, the two screens are offset horizontally by half a pitch such that the bars of the first screen are facing a space in the second screen.

Each screen is advantageously associated with a receptacle, possibly a single pot for the two screens, so that chips that pass between the bars can be recovered.

The conveyor according to the invention is preferably associated with a vibrating bowl on the downstream side capable of aligning cylindrical objects, and with a device on the upstream side used to turn over a storage receptacle for these objects.

According to another aspect, the purpose of the invention is a method for aligning cylindrical objects stored in bulk while making the first selection of objects with predetermined dimensions, particularly by evacuating chips and dust from cylindrical objects away from the conveyor, and preferably recovering them in an associated pot. The method includes placement of objects on a first conveying element, possibly dual, comprising a vibrating screen, particularly bars aligned parallel to their axis and at a spacing, the displacement of objects due to vibration of the screen towards a second screen, preferably identical to the first and separated from the first layer of bars vertically and offset in the horizontal plane, the objects being transferred onto the second screen by a chute possibly being turned over, displacement of objects onto the second screen by vibrating it, advantageously at a speed greater than the first screen.

Preferably, the method is used for nuclear fuel pellets derived from a turned over storage boat, in a confined environment, for their transfer to a vibrating bowl enabling organized alignment.

BRIEF DESCRIPTION OF THE DRAWINGS

The characteristics and advantages of the invention will be better understood after reading the following description with reference to the attached drawings, given for illustrative purposes and in no way limitative.

FIGS. 2A and 2B show a system according to the invention.

DETAILED PRESENTATION OF PARTICULAR EMBODIMENTS

Figure 1:
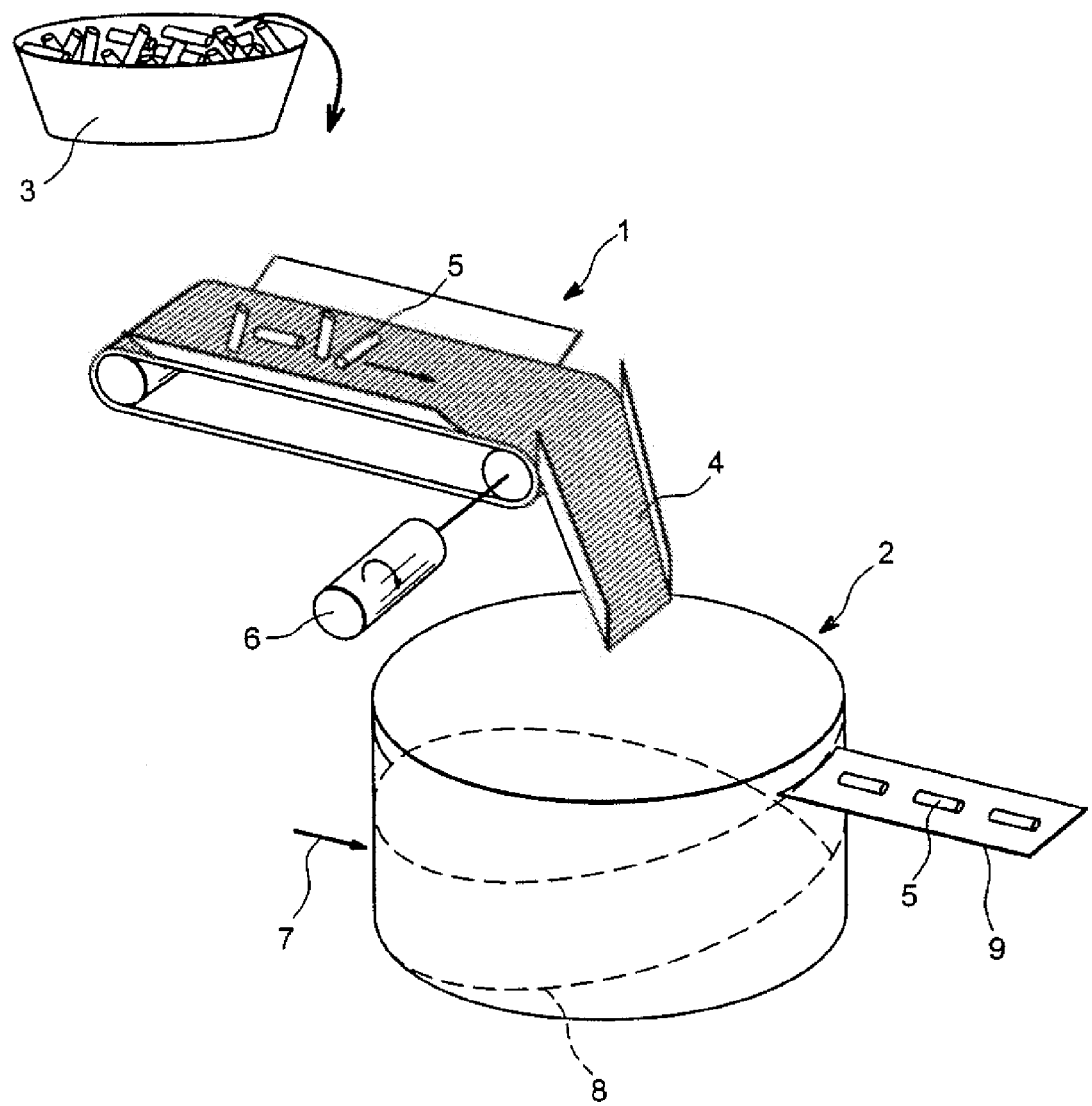
FIG. 1 diagrammatically shows an existing alignment device.

Once pressed, the nuclear fuel pellets are placed in a storage system such as a boat that can be inserted in the sintering furnace. In particular, according to one preferred embodiment, the boats contain between 9 and 12 kg of bulk pellets, in other words disordered pellets.

Once sintered, according to one advantageous mode provided simply as an example, the pellets are cylinders of revolution with a diameter of 8 to 9.5 mm and a length of 11 to 12 mm, with a weight of between 6 and 8 g. Pellets may have been fractured during sintering, generating more or less particulate residue, that most of the time remains mixed with the pellet stock.

When the pellets thus manufactured are intended to be inserted in nuclear fuel rods, according to existing systems the boats are turned over on a belt conveyor by means of a conventional mechanical device. As diagrammatically shown in FIG. 1, the belt conveyor 1 according to prior art supplies a vibrating bowl 2 with the content of the boats 3 by means of a pouring spout 4: the conveyor supply belt 1 moves the pellets 5 in bulk as far as the vibrating bowl 2, for example by means of a three-phase motor 6, progress being slaved by a filling sensor 7 of the vibrating bowl 2.

The geometry of the bowl 2 and the generated vibrations cause alignment of the pellets 5: the pellets 5 rotate inside the tank of bowl 2 while rising on the ramps 8, thus being carried as far as the output from the bowl 2 where they are picked up by a conveyor 9 that takes them as far as the grinding wheels.

Obviously, both for the state of the art and for the system according to the invention, these nuclear fuel manufacturing steps are carried out automatically in an hermetically closed environment such as a glove box, and any necessary human intervention is made remotely.

According to the invention, the conventional conveyor 1 and pouring spout 4 are replaced so as to make a preliminary sort and only pour pellets 5 that satisfy minimum requirements into the bowl 2, avoiding any contaminating dust or chips.

In particular, instead of being poured on a simple conveyor 1, the boat 3 is turned over by mechanical means that may be similar to the previous means, progressively on a conveyor device 10 capable of spreading pellets to regulate the flow. As shown in FIGS. 2A and 2B, the conveyor device preferably comprises a corridor 12 on the upstream side similar to the above conveyor 1 capable of distributing all poured pellets on its surface so as not to delay calling of a new boat 3.

The vibrating corridor 12 supplies a first screen 14 that extends it so that chips from the pellets 5 can be eliminated; it is also possible to pour the contents of the boat 3 directly onto this first screen 14. In particular, the first screen 14 may be composed of a layer of metallic bars 16 parallel to each other along their longitudinal axis and at a spacing such that whole pellets 5 can circulate while chips falling between the bars 16 are eliminated. Preferably, the diameter of each bar 16 is of the order of 6 mm for the target application, and the pitch of the layer is also of the order of 6 mm.

Advantageously, the screen 14 is vibrated by means of a vibrating base 18 to which the bars 16 are connected; the amplitude and frequency of vibrations determine an advance speed of the pellets 5. such a displacement system is known for example as disclosed in document JP 1 318 996.

According to the invention, the conveyor device 10 also comprises a second screen 24, advantageously of the same nature as the first screen, offset vertically and downwards from the first screen 14 so as to force the pellets 5 reaching its end to spin around when moving from the upper grid 14 to the lower grid 24. Preferably, the second screen 24 is separated from the first by a vertical distance d that is slightly less than the length of a pellet 5, such that the pellet 5 cannot <<fall>> on the upstream side of the screen 24 and will not break.

Preferably, the bars 26 of the second screen 24 are also offset by a half pitch in the horizontal plane and are staggered, to accentuate the pellets 5 being turned as they cross over the vertical offset. Thus, the largest chips that could have passed on the first part 14 of the device 10 without being trapped, can also be eliminated.

The second screen 24, like the first, is advantageously vibrated by means of a base 28, however the frequency and amplitude of the vibrations are preferably determined such that the displacement speed of the pellets on the second screen 24 is greater than the displacement speed on the first screen 14. Thus, the cylindrical objects 5 can be separated by changing the speed and latency due to the drop, and no congestion takes place.

Therefore this downstream part 14, 24 of the conveyor device 10 according to the invention can eliminate all chips and dust from the flow of pellets 5 output from the vibrating corridor 12. For example, chips may be recovered in a pot 30 placed under the screens 14, 24 and provided with a filling sensor.

Chips refer to parts of pellets, residues of breakage during pressing, but also for example disks (short pellets) and pieces (pellets broken during sintering): pellets 5 may be preselected depending on the pitch of the screens 14, 24, so as to minimize risks of blockage on the conveyor means on the downstream side of this device 10.

As in prior art shown in FIG. 1, the pellets 5 thus sorted are poured into an alignment device such as a bowl 32, through a spout 34; the bowl 32 advantageously comprises a helical spiral 38 open at the top so that pellets can be gripped from above. The flow of pellets 5 at the exit from the device, in other words the assembly composed of the corridor 12, screens 14, 24 and the bowl 32 may be adjusted to between 2 and 3.3 pellets per second (±5%).

Advantageously and according to known art, a conveyor 9 (see FIG. 1) may take the aligned pellets from the exit from the bowl 32 as far as a grinding wheel and then a diameter checking system, and so on until the rods are completely finished.

The invention claimed is:

1. A conveyor device, intended to align cylindrical objects possibly containing chips, such as nuclear fuel pellets, the device comprising at least a first vibrating screen and a second vibrating screen each enabling displacement of the objects along a first direction by vibration, the first screen and the second screen each being composed of parallel bars at regular intervals, for which the longitudinal axis forms the first direction, the first screen and the second screen being positioned one after the other in the direction of displacement and being separated from each other along a second vertical direction, such that the cylindrical objects are forced to spin around when dropping on the second screen located under the first screen, device in which each screen is coupled to vibrating means independent from each other, such that the displacement speed on the second screen is greater than the displacement speed on the first screen.

2. A device according to claim 1 in which bars of each screen are similar, and bars of the second screen are offset by half a pitch from the bars of the first screen in the plane of the screen.

3. A device according to claim 1 also comprising a corridor connected to the upstream side of the first screen and enabling the displacement of cylindrical objects along the first direction towards the first screen.

4. A device according to claim 1 also comprising at least one pot designed to recover chips and dust passing through the screens.

5. A device according to claim 1 also comprising a vibrating bowl on the downstream side of the last screen.

6. A method for aligning cylindrical objects possibly containing chips, such as nuclear fuel pellets, method comprising positioning of cylindrical objects on a first screen composed of parallel bars for which a longitudinal axis forms a first direction, displacement of objects by vibrating the first screen along the first direction towards an end of the first screen, cylindrical objects dropping on a second screen composed of parallel bars for which the longitudinal axis forms the first direction such that the cylindrical objects are forced to spin around, the second screen located under the first screen, displacement of objects on the second screen by its vibration, method in which the displacement speed of objects on the second screen is greater than the displacement speed of objects on the first screen.

7. A method according to claim 6 in which the second screen is vertically separated from the first screen by a distance smaller than the length of the objects.

8. A method according to claim 6 in which each screen is composed of parallel bars spaced at a constant pitch along the displacement direction of the cylindrical objects, the bars of the second screen being offset by half a pitch from bars in the first screen in the plane of the screens.

9. A method according to claim 6 also comprising the supply of an alignment device through the second screen.

10. A method according to claim 6 comprising a storing system turning over the cylindrical objects on the first screen.

11. A method according to claim 6 comprising recovery of chips and dust from cylindrical object passing through the screens.

12. A device according to claim 2, wherein the half pitch in the horizontal plane accentuates turning of the cylindrical objects as they cross over the vertical offset.

* * * * *